Patented Apr. 5, 1949

2,466,118

UNITED STATES PATENT OFFICE 2,466,118

PRECIPITATION OF AMMONIUM DIURANATE

Arthur J. Miller, Oak Ridge, Tenn., and Gerald M. Armstrong, Providence, R. I., assignors, by mesne assignments, to the United States of America as represented by the United States Atomic Energy Commission No Drawing. Application April 5, 1946, Serial No. 659,852

5 Claims. (Cl. 23—14.5)

Our invention relates to the separation of uranium from aqueous solutions containing uranyl ions and fluoride ions, and especially to an improved process for the precipitation of ammonium diuranate from aqueous solutions of uranyl fluoride.

Attempts to precipitate ammonium diuranate from aqueous solutions containing uranyl ions and fluoride ions, employing a stoichiometric quantity of ammonium hydroxide or a moderate excess, have resulted in incomplete recovery of uranium. On the other hand, if a large excess of ammonium hydroxide is added to an aqueous solution containing uranyl ions and fluoride ions, the resulting precipitation may be substantially quantitative, but the precipitate is extremely finely divided and is difficult to recover by decantation, centrifugation, or even by filtration.

An object of the present invention is to provide an improved process for the precipitation of ammonium diuranate from aqueous solutions containing uranyl ions and fluoride ions.

Another object is to provide a multiple stage precipitation process for the recovery of ammonium diuranate from an aqueous uranyl fluoride solution or other aqueous solution containing uranyl ions and fluoride ions, whereby there is obtained a substantially quantitative precipitate of ammonium diuranate having improved sedimentation and filtration characteristics.

Other objects and advantages of our invention will be evident from the following description.

In accordance with our present invention there is incorporated in an aqueous solution containing uranyl ions and fluoride ions sufficient ammonium hydroxide to precipitate a major portion of the uranium as ammonium diuranate, the resulting slurry is digested at an elevated temperature, then there is incorporated in the digested slurry sufficient additional ammonium hydroxide to prevent substantial complexing of uranyl ions by fluoride ions, and the ammonium diuranate precipitate is finally separated from the supernatant solution by any suitable means such as decantation, centrifugation, or filtration.

The aqueous solutions from which ammonium diuranate can be precipitated in accordance with our invention may be neutral or acidic solutions containing any soluble uranyl compound and any soluble fluoride. The invention is especially adapted, however, for the separation of uranium from substantially neutral solutions of uranyl fluoride, such as those obtained by dissolving uranium hexafluoride in water.

The initial precipitation step is suitably effected at a temperature of 15–45° C. and preferable at about room temperature, e. g., 20–30° C. The initial addition of ammonium hydroxide should be sufficient to precipitate a major portion of the uranium, and suitably constitutes at least the stoichiometric quantity of ammonium hydroxide required to neutralize any acidity and to precipitate all of the uranium in the absence of fluoride ion. Generally, the quantity of ammonium hydroxide to be used in the initial precipitation may range from 1 to 3 times the stoichiometric quantity, but is preferably 2 to 3 times this quantity.

After the initial precipitation, the resulting slurry is digested at a temperature substantially above the precipitation temperature. This digestion is suitably effected at 55–75° C. for 2–20 minutes, and preferably at 60–70° C. for 5–10 minutes.

At the conclusion of the digestion, the slurry is preferably cooled to about the initial precipitation temperature before effecting the succeeding precipitation step. Additional ammonium hydroxide is then added to the slurry in an amount sufficient to prevent substantial complexing of uranyl ions by fluoride ions, and thus secure substantially quantitative precipitation of ammonium diuranate. The additional ammonium hydroxide is preferably added without agitation, and without unduly disturbing the precipitate which has settled during the digestion period.

The amount of additional ammonium hydroxide to be added after digestion should be sufficient to provide a total of at least five times the stoichiometric quantity previously defined. The total amount of ammonium hydroxide is preferably 7–13 times this stoichimetric quantity when treating solutions having an initial atomic ratio of fluorine to uranium not substantially greater than 6 to 1. Greater quantities of ammonium hydroxide may, of course, be employed when processing solutions of unusually high fluoride content.

The ammonium hydroxide which is incorporated in the digested slurry to obtain the desired total concentration may be introduced by a single addition, or by multiple additions, with or without intervening digestion of the slurry. Generally, the most desirable procedure is to employ a single addition, and to separate the ammonium diuranate precipitate without further digestion at elevated temperatures. Any suitable separation procedure may be used, such as decantation, centrifugation, or filtration, since the procedure of the present invention improves both sedimentation and filtration rates. It is generally preferred, however, to separate the precipitate by filtration.

Our invention will now be further illustrated by the following specific examples:

Example I

Uranium hexafluoride was dissolved in water to form uranyl fluoride solutions containing 203 g. of uranium per liter. Ammonium diuranate was precipitated from one such solution by a single stage precipitation with ammonium hydroxide, and from another by a two stage precipitation with intermediate digestion of the first precipitate. The half-volume sedimentation time was then determined in each case. The results are shown in the table below:

| No. of stoichiometric equivalents of $NH_4OH$ | | Digestion Temperature | Digestion Time, min. | Half-Volume Sedimentation Time, min. |
|---|---|---|---|---|
| During Digestion | Final | | | |
| | | °C. | | |
| 7.8 | 7.8 | 60 | 5 | 25.0 |
| 2.4 | 7.8 | 58 | 5 | 3.5 |

Example II

Ammonium diuranate was precipitated from uranyl fluoride solutions in accordance with the procedures of Example I. The filtration rates of the resulting slurries were then determined under identical filtration conditions. The results are shown in the table below:

| No. of stoichiometric equivalents of $NH_4OH$ | | Digestion Temperature | Digestion Time, min. | Filtration Rate, Liters per hr. |
|---|---|---|---|---|
| During Digestion | Final | | | |
| | | °C. | | |
| 7.8 | 7.8 | 60 | 20 | 0.75 |
| 2.8 | 7.8 | 70 | 10 | 4.76 |
| 2.5 | 13.0 | 65 | 10 | 7.69 |

In both of the above examples, the final ammonium ion concentration was sufficiently high in all cases to obtain substantially quantitative precipitation of the uranium in spite of the high fluoride concentration. As shown in the tables, however, the sedimentation and filtration rates were greatly different, depending on the precipitation procedure.

It is to be understood, of course, that the above examples are merely illustrative, and do not limit the scope of the present invention. The initial and final concentrations of ammonium hydroxide may differ from those employed in the examples, and the precipitation procedure may be modified in numerous respects within the scope of the foregoing description. In general it may be said that the use of any equivalents or modifications of procedure which would naturally occur to those skilled in the art is included in the scope of this invention. Only such limitations should be imposed on the scope of our invention as are indicated in the appended claims.

We claim:

1. A process for the recovery of hexavalent uranium from an aqueous solution containing uranyl ions and fluoride ions, which comprises incorporating in said solution sufficient ammonium hydroxide to precipitate a major portion of the uranium as ammonium diuranate, digesting the resulting slurry at an elevated temperature, incorporating in the digested slurry sufficient additional ammonium hydroxide to prevent substantial complexing of uranyl ions by fluoride ions, and separating the ammonium diuranate precipitate from the supernatant solution.

2. A process for the recovery of hexavalent uranium from an aqueous solution containing uranyl ions and fluoride ions, which comprises incorporating in said solution, at a temperature of 15–45° C. sufficient ammonium hydroxide to precipitate a major portion of the uranium as ammonium diuranate, digesting the resulting slurry at a temperature of 55–75° C. for 2–20 minutes, cooling the digested slurry to a temperature of 15–45° C., incorporating in said slurry sufficient additional ammonium hydroxide to prevent substantial complexing of uranyl ions by fluoride ions, and separating the ammonium diuranate precipitate from the supernatant solution.

3. A process for the recovery of hexavalent uranium from an aqueous solution containing uranyl ions and fluoride ions, which comprises incorporating in said solution from 1 to 3 times the stoichiometric quantity of ammonium hydroxide required to precipitate the uranium as ammonium diuranate, digesting the resulting slurry at an elevated temperature, incorporating in the digested slurry sufficent additional ammonium hydroxide to provide a total of at least 5 times said stoichiometric quantity, and separating the ammonium diuranate precipitate from the supernatant solution.

4. A process for the recovery of hexavalent uranium from an aqueous solution containing uranyl ions and fluoride ions, which comprises incorporating in said solution, at a temperature of 15–45° C., from 1 to 3 times the stoichiometric quantity of ammonium hydroxide required to precipitate the uranium as ammonium diuranate, digesting the resulting slurry at 55–75° C. for 2–20 minutes, cooling the digested slurry to a temperature of 15–45° C., incorporating in said slurry sufficient additional ammonium hydroxide to provide a total of at least 5 times said stoichiometric quantity, and separating the ammonium diuranate precipitate from the supernatant solution.

5. A process for the recovery of hexavalent uranium from an aqueous solution of uranyl fluoride obtained by dissolving uranium hexafluoride in water, which comprises incorporating in said solution, at a temperature of 20–30° C., from 2 to 3 times the stoichiometric quantity of ammonium hydroxide required to precipitate the uranium as ammonium diuranate, digesting the resulting slurry at 60–70° C. for 5–10 minutes, cooling the digested slurry to 20–30° C., incorporating in said slurry sufficient ammonium hydroxide to provide a total of 7–13 times said stoichiometric quantity, and filtering the resulting slurry to separate the ammonium diuranate precipitate from the supernatant solution.

ARTHUR J. MILLER.
GERALD M. ARMSTRONG.

No references cited.